Sept. 23, 1930.   N. R. LILLIG   1,776,473
BOLT AND NUT LOCK
Filed Dec. 27, 1929
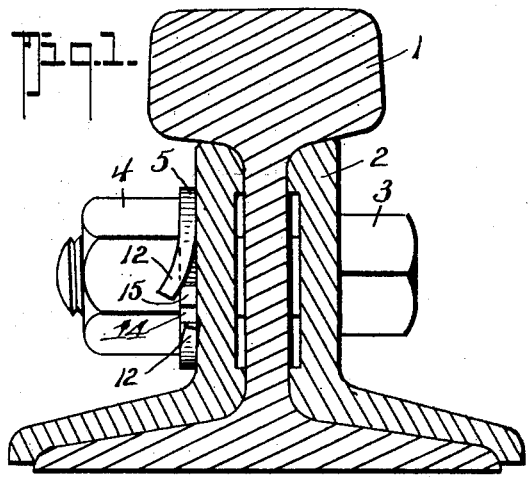
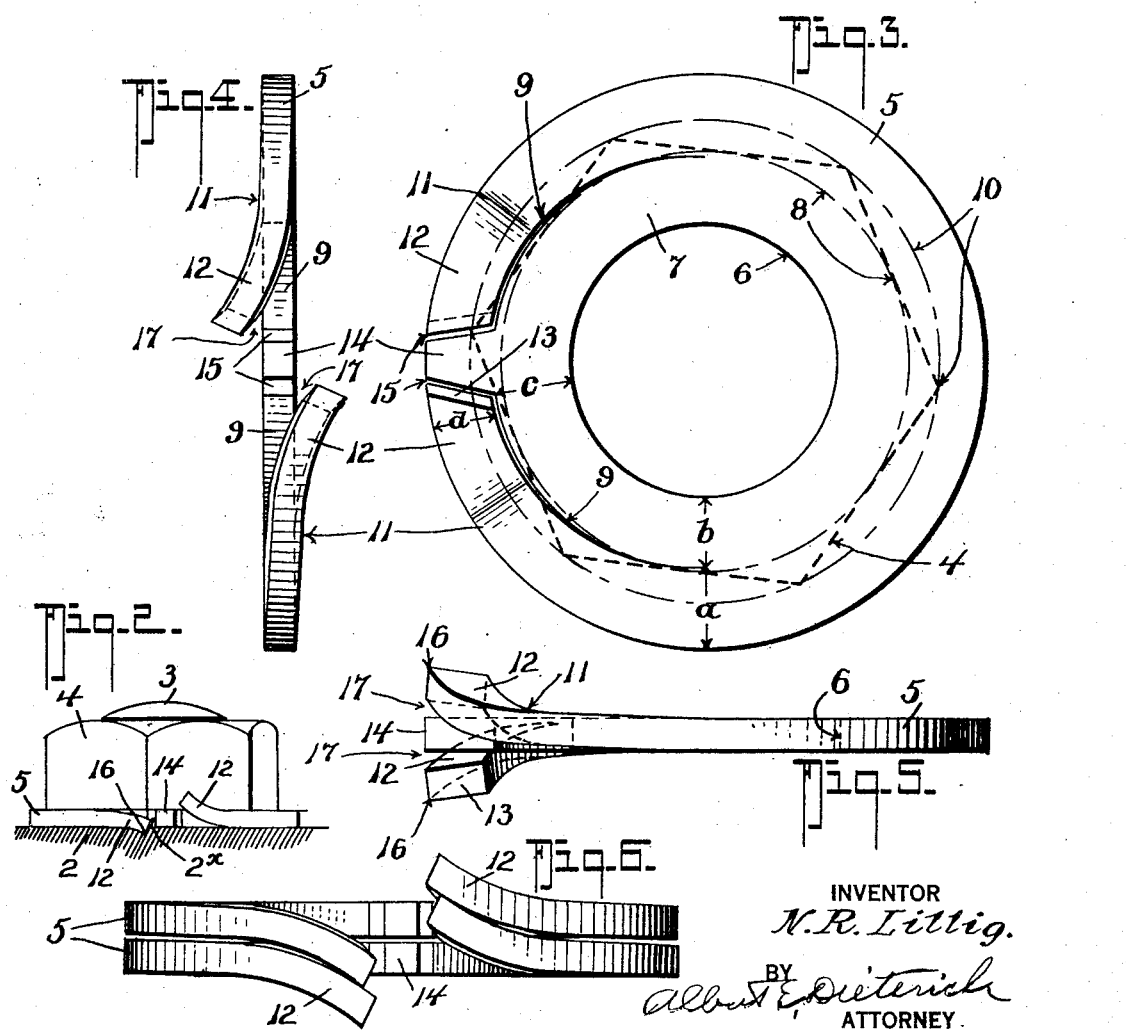
INVENTOR
N. R. Lillig.
BY
Albert E. Dieterich
ATTORNEY.

Patented Sept. 23, 1930

1,776,473

UNITED STATES PATENT OFFICE

NICHOLAS RICHARD LILLIG, OF PORTLAND, OREGON, ASSIGNOR TO TICE LOCK-WASHER MANUFACTURING CO., OF PORTLAND, OREGON, A CORPORATION OF OREGON

BOLT AND NUT LOCK

Application filed December 27, 1929. Serial No. 416,914.

My present invention which relates to the art of lock washers particularly has for its object to provide a washer with an annulus unbroken in the general circular direction in which it extends and provided with spring jaws at its periphery and with means interposed between the proximate ends of adjacent jaws which will serve several functions, viz: to prevent tangling of the washers when they are packed together for shipment or when two or more washers are used as shims, to provide means to cooperate with the biting jaw and the material "plowed up", thereby to hold the washer against reverse movement beyond a slight amount necessary to dig in, and to provide a substantially continuous perimeter for the washer (which admits of advantageous manufacturing).

Further, it is an object to provide a lock washer of a simple construction so designed that it may be manufactured with ease and at low cost and will effectively serve its intended purpose.

Further, it is an object to provide a lock washer of such construction that its jaw will not have to dig in deeply in order to hold the washer from turning backwardly when it is attempted to remove a nut.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a vertical cross section of a rail structure with my invention applied.

Figure 2 is a slightly enlarged detail elevation of a washer and nut with the part against which the washer bears shown in cross section to illustrate how the biting jaw ploughs in.

Figure 3 is an enlarged face view of the washer.

Figure 4 is an edge view of the same looking from left to right in Figure 3.

Figure 5 is an edge view of the same looking from bottom to top in Figure 3.

Figure 6 is an edge view of two washers showing how they stack without interlocking.

In the drawing in which like numerals and letters of reference indicate like parts in all of the figures, 1 represents the rail, 2 the fish plates, 3 the bolt and 4 the nut while 5 indicates the washer which constitutes the subject matter of my present invention.

The washer 5 consists of a disk provided with a bolt hole 6. The disk is provided with two slits 9 preferably arranged somewhat eccentrically to the bolt hole 6 and leaving between the slits and the bolt hole an annulus 7 which is unbroken in the general circular direction in which it extends. The slits 9 join with outwardly converging slits 15 leaving between the slits 15 a tongue 14 that lies in the general plane of the annulus 7 at all times.

The slits 9 are preferably eccentric so as to provide a somewhat wider space ($a$) from the slit to the periphery of the washer at its inner end than the distance ($b$) from the same slit end to the bolt hole, thereby providing jaws 12 which are integral with the annulus and are of greater width at the base ($a$) than at the free ends ($d$), the distance ($d$) being less than the distance ($c$) thus giving greater strength to the jaws than would be the case were they of the same width at the base as at the free end.

8 designates the inner or minor diameter of the nut 4 and 10 designates the outer or major diameter of the nut 4, the nut being shown in dotted lines and the diameter and circumference of the inner and outer diameters of the nut being indicated by broken lines 8 and 9 in Figure 3.

The jaws 12 are off-set to opposite sides of the plane of the annulus 7, the inclination of the jaws to the annulus being gradual from the base or inner ends to a point approximately that indicated by 11 from which they are given a more abrupt bend in order to bring the free ends 13 of the jaws to one side of the plane of the annulus 7 and of the tongue 14. It is to be noted, too, that this produces bevelled end faces 13 as it were leaving the points 16 farthest from the plane of the annulus. These points are the plowing or digging in points of the jaws.

It will also be noted that the spaces indicated at 17 in Figures 3 and 5 between the ends of the jaws 12 and the adjacent faces of the annulus 7 are less than the thickness of the annulus or of the jaws. The purpose of this is to prevent the jaws of one washer from interlocking or tangling with the jaws of another washer laid against it as indicated in Figure 6, since one jaw of each washer will engage the tongue of the other washer (on opposite sides) and enable the washers to nest perfectly without interlocking.

Furthermore by converging the slits 15 from the slits 9 outwardly the digging in or plowing points 16 are located at the extreme periphery of the washer and when the nut is screwed home and the jaw 12 digs in (see Figure 2), the shavings or material 2$^x$ plowed up will work in between the face 13 and the adjacent face of the tongue 14 as a wedge and stop further movement of the washer backwards.

It should, of course, be understood that the material of which the washers 5 are made is such that it may be tempered and the jaws 12 become stiff spring jaws so that they will not snap off when bent back into the plane of the washer as a whole.

It is also to be observed that the slits 9 from about the bend 11 to the free ends of the jaws lie to the outside of the minor diameter of the nut with which the washer is to be employed and they lie also well within the major diameter of the nut, see Figure 3. The purpose of this is to enable the jaw 12 which is adjacent the nut to spring up against the side face or flat of the nut, see Figures 1 and 2, and thereby hold the nut against being turned off while a corner or angle of the nut will overlie a portion of the tongue 14 and project over a portion of the free end of the biting under jaw 12.

By providing the tongue 14 the space between the ends of the jaws is reduced in such manner as greatly to facilitate the stacking of the washers for shipment; and also, when in use, to cooperate with the biting jaw to effect a grip on the fish plate 2 or other part into which the biting jaw digs so as to stop the backward rotation of the nut in the smallest distance possible.

With washers of the type disclosed in the applications aforesaid, there is a considerable space between the ends of the jaws and therefore it sometimes happens that in slacking off a nut under which such washer is placed the bottom jaw digs into the piece which has been fastened. In moving backwards the jaw pushes in front of it an ever-increasing accumulation of metal until it has dug in sufficiently to stop its backward motion. This digging in of the washers is sometimes so great that unless the jaw is pried up by hand or chiseled off it must be broken in order to loosen the nut. This applies to the old style lock washers without the tongue 14. With the present washer having the tongue 14 it is found that the accumulation of plowed up material does not have to be nearly so great in order to stop the reverse movement of the washer as the plowed pieces lodge between the jaw 12 and the tongue 14 as before described. This makes the digging in process more positive and it becomes effective in but a fraction of the space required in the old style washer.

From the foregoing description, taken in connection with the accompanying drawing, it is thought the construction, functions and advantages of my present invention will be clear to those skilled in the art to which it relates.

What I claim is:

1. A lock washer comprising a disk having a bolt hole surrounded by an annulus which is provided with a pair of longitudinal slits merging with outwardly directed and outwardly converging slits at the proximate ends of said longitudinal slits, thereby defining a pair of jaws, and a tongue located between the ends of said jaws and having its edges which are opposite the ends of the jaws converging outwardly toward the radius of the washer which passes through the center of the tongue, said jaws being off-set from opposite faces of said disk, whereby their ends lie a distance beyond said faces for the purposes described.

2. A lock washer comprising a disk having a bolt hole surrounded by an annulus which is provided with a pair of longitudinal slits merging with outwardly directed converging slits at the proximate ends of said longitudinal slits, thereby defining a pair of jaws, and a flat tongue located between the ends of said jaws, said jaws being off-set from opposite faces of said disk whereby their ends lie a distance beyond said faces, the ends of said jaws lying closer together at the periphery of the disk than adjacent the central annulus of the disk thereby defining cutting corners at the peripheral edges of the jaws for the purpose described.

3. A lock washer for nuts and bolts comprising an annulus which is unbroken in the general circular direction in which it extends, said annulus having a plurality of spring jaws integral with it, the inner longitudinal edges of which jaws lie at distances from the center of the washer approximately that of the minor diameter of the nut or bolt head with which the washer is to be used, and less than the maximum diameter of the same, said jaws being arranged in pairs with their free ends facing one another, one jaw being extended beyond one face of the washer while the other jaw is extended beyond the other face of the washer, thereby providing a reversible washer, one jaw of which will be pressed into the adjacent part being secured while the other jaw will engage with a flat face of the contiguous side wall of the nut or bolt head, and a flat tongue projecting from the annulus between the facing ends of said jaws said tongue being of less width at its base than the length of the tongue and the ends of said jaws lying close to the tongue and with their edges substantially parallel to the adjacent edges of the tongue.

4. A lock washer for nuts and bolts comprising an annulus which is unbroken in the general circular direction in which it extends, said annulus having a plurality of spring jaws integral with it, the inner longitudinal edges of which jaws lie at distances from the center of the washer approximately that of the minor diameter of the nut or bolt head with which the washer is to be used, and less than the maximum diameter of the same, said jaws being arranged in pairs with their free ends facing one another, one jaw being extended beyond one face of the washer while the other jaw is extended beyond the other face of the washer, thereby providing a reversible washer, one jaw of which will be pressed into the adjacent part being secured while the other jaw will engage with a flat face of the contiguous side wall of the nut or bolt head, and a flat tongue projecting from the annulus between the facing ends of said jaws, said jaws having their opposing edges converging outwardly thereby defining cutting corners at the outermost extremities of said jaws.

N. RICHARD LILLIG.